UNITED STATES PATENT OFFICE.

MORITZ ULRICH AND JOHANNES BAMMANN, OF ELBERFELD, GERMANY, ASSIGNORS TO THE FARBENFABRIKEN, VORMALS FR. BAYER & CO., OF SAME PLACE.

AZO COLORING-MATTER.

SPECIFICATION forming part of Letters Patent No. 482,106, dated September 6, 1892.

Application filed February 1, 1892. Serial No. 419,947. (Specimens.) Patented in England August 26, 1890, No. 13,443; in France December 6, 1890, No. 210,033, and in Italy April 27, 1891, XXV, 29,631.

*To all whom it may concern:*

Be it known that we, MORITZ ULRICH and JOHANNES BAMMANN, doctors of philosophy and chemists, subjects of the Emperor of Germany, residing at Elberfeld, Germany, (assignors to the FARBENFABRIKEN, VORMALS FR. BAYER & CO., of Elberfeld,) have invented a new and useful Improvement in the Manufacture of Direct-Dyeing Coloring-Matter, (for which the aforesaid FARBENFABRIKEN has already obtained Letters Patent in England, No. 13,443, dated August 26, 1890; in France, No. 210,033, dated December 6, 1890, and in Italy, Vol. XXV, No. 29,631, dated April 27, 1891,) of which the following is a specification.

Our invention relates to the production of a new blue coloring-matter by combining one molecular proportion of tetrazo-diphenyl chloride with one molecular proportion of alpha-naphthylamine by diazotizing the thus-formed intermediate product, which contains still one free amido group, and by subsequently combining the obtained hexazo compound with two molecular proportions of the sodium salt of that 1.8 amido-naphthol beta-disulpho-acid which results, when the mononitro derivative of the naphthalene trisulpho-acid described in the German Patent No. 38,281, dated September 2, 1885, is reduced and the resulting alpha-naphthylamine trisulpho-acid is melted with alkalies at temperatures from about 200° to 210° centigrade.

In carrying out our process practically we proceed as follows: 18.4 kilos, by weight, of benzidine or the corresponding quantity of one of its salts are, after the addition of muriatic acid, diazotized in the well-known manner by a solution of fourteen kilos, by weight, of sodium nitrate in seventy liters of water. The resulting solution of tetrazo-diphenyl chloride is then allowed to flow on, stirring into a cold solution of 14.3 kilos, by weight, of alpha-naphthylamine in hydrochloric acid, an excess of the latter being employed. When after twenty-four hours the production of the intermediate product is completed a solution of seven kilos, by weight, of sodium nitrate is added and the resulting liquid is acidulated by adding the necessary quantity of hydrochloric acid, the diazotation is finished within a short time. The solution thus obtained, after having been filtered, is added to the solution in water of 72.6 kilos, by weight, of the sodium salt of the 1.8 amido-naphthol beta-disulpho-acid, which is obtained when the mononitro derivative of the naphthalene trisulpho-acid described in the German Patent No. 38,281, dated September 2, 1885, is reduced and the resulting alpha-naphthylamine trisulpho-acid is melted with alkalies at temperatures of from about 200° to 210° centigrade. The production of the dye-stuff begins immediately and is complete after about twenty-four hours. It is isolated in the usual manner by salting out, filtering off, pressing, and drying.

Our new dye-stuff, which corresponds to the following formula,

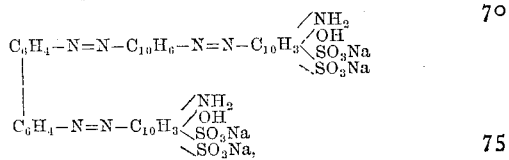

is not identical with the dye-stuff derived from tetrazo-diphenyl, which is obtained according to the specification of Letters Patent No. 462,415, dated November 3, 1891. The latter is formed by combining one molecular proportion of tetrazo-diphenyl chloride with one molecular proportion of amido-naphthol disulpho-acid and one molecule of alpha-naphthylamine, and therefore corresponds to the formula:

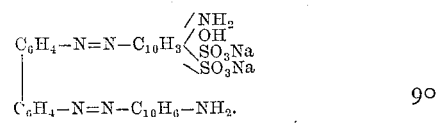

According to the specification of Letters Patent No. 462,864, dated November 10, 1891, new tetrazo dye-stuffs are obtained by the combination of one molecular proportion of a tetrazo-diphenyl or tetrazo-ditolyl salt with one molecular proportion of naphthylamine by again diazotizing the formed intermediate product, and by subsequently combining with two molecular proportions of alpha-naphthol disulpho-acid.

The dye-stuff derived from benzidine possesses the following formula,

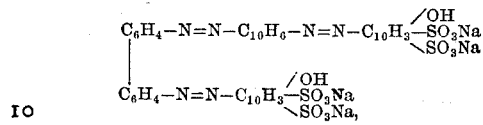

and differs from our coloring-matter, as the latter is formed by employing an amido-naphthol disulpho-acid in place of naphthol disulpho-acid.

Our coloring-matter represents in dry state and when finely pulverized a grayish-black powder, which easily dissolves in hot water with dark-blue color. On adding strong acids to its watery solution a dark-blue precipitate is separated. In solutions of sodium carbonate and in ammonia liquid it is soluble with dark-blue color, and in soda-lye it dissolves with reddish-blue color. By concentrated sulphuric acid it is dissolved with greenish-blue color, and when this sulphuric-acid solution is mixed with water a flaky-blue precipitate separates. It produces when dyed on unmordanted cotton in alkaline soap-baths a pure greenish-blue fast to light. When the cotton on which our color has been fixed in this simple manner is allowed to pass through a watery solution of sodium nitrate and diluted mineral acid, and after having been washed out is placed into an alkaline solution of beta-naphthol the greenish-blue shade is changed into black, the so-produced dye is fast to soaping and fulling.

Having now described our invention and in what manner it can be performed, that which we claim as new, and desire to secure by Letters Patent, is—

1. The process for producing a blue direct-dyeing coloring-matter by combining one molecular proportion of tetrazo-diphenyl chloride with one molecular proportion of alpha-naphthylamine by further diazotizing the thus-formed intermediate product and by subsequently combining the obtained hexazo compound with two molecular proportions of the sodium salt of the 1.8 amido-naphthol beta-disulpho-acid, hereinbefore described.

2. As a new product, the dye-stuff hereinbefore described, which corresponds to the formula:

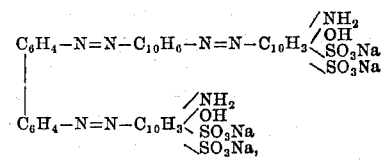

which is in dry state and when finely pulverized a grayish-black powder, easily soluble in hot water with dark-blue color, on the addition of acids a dark-blue precipitate separates, in solutions of sodium carbonate and in ammonia-liquid it is soluble with dark-blue color, and in soda-lye with reddish-blue color, in concentrated sulphuric acid it is soluble with greenish-blue color, and on addition of water a flaky-blue precipitate is separated, it dyes unmordanted cotton in alkaline soap-baths a pure greenish-blue, and the said dyed cotton if passed through a watery solution of sodium nitrite and diluted mineral acid, washed and placed in an alkaline solution of beta-naphthol, changes this greenish-blue shade to black.

In testimony whereof we have signed our names in the presence of two subscribing witnesses.

MORITZ ULRICH.
JOHANNES BAMMANN.

Witnesses:
WM. ESSEUXLIER,
RUDOLPH FRICKE.